United States Patent
Zembutsu et al.

(10) Patent No.: US 11,991,553 B2
(45) Date of Patent: May 21, 2024

(54) CONTROL DEVICE, COMMUNICATION TERMINAL, CONTROL METHOD, NON-TRANSITORY COMPUTER READABLE MEDIUM, MME, AND BASE STATION FOR CONTROLLING A TRANSMISSION RESOURCE USING A COMMUNICATION PATTERN (CP) PARAMETER

(71) Applicant: NEC Corporation, Tokyo (JP)

(72) Inventors: Hajime Zembutsu, Tokyo (JP); Toshiyuki Tamura, Tokyo (JP); Naoaki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/836,082

(22) Filed: Jun. 9, 2022

(65) Prior Publication Data

US 2022/0303827 A1  Sep. 22, 2022

Related U.S. Application Data

(63) Continuation of application No. 16/636,809, filed as application No. PCT/JP2018/029614 on Aug. 7, 2018, now Pat. No. 11,425,596.

(30) Foreign Application Priority Data

Aug. 8, 2017  (JP) .................................. 2017-153290

(51) Int. Cl.
*H04W 28/02* (2009.01)
*H04W 8/02* (2009.01)
(Continued)

(52) U.S. Cl.
CPC ......... *H04W 28/0289* (2013.01); *H04W 8/02* (2013.01); *H04W 12/06* (2013.01);
(Continued)

(58) Field of Classification Search
CPC ......... H04W 12/00; H04W 12/06–069; H04W 28/00; H04W 28/02–0294; H04W 72/00;
(Continued)

(56) References Cited

U.S. PATENT DOCUMENTS 6,873,698 B1  3/2005  Pearson ............... H04Q 3/0029
                                                     379/221.08
9,848,646 B2  12/2017  Liu ..................... H04L 63/0884
(Continued)

FOREIGN PATENT DOCUMENTS

CN  107872790  *  9/2016  ............ H04W 28/22
CN  108632887  *  3/2017  ............ H04W 28/10
(Continued)

OTHER PUBLICATIONS

JP Office Action for JP Application No. 2021-112516, dated Jun. 28, 2022 with English Translation.
(Continued)

*Primary Examiner* — Warner Wong
(74) *Attorney, Agent, or Firm* — Sughrue Mion, PLLC

(57) ABSTRACT

An object is to provide a control device which can control, in consideration of a traffic characteristic of an application operating between an application server and a communication terminal, traffic or a data amount transferred on a core network. A control device (10) according to the present example embodiment includes: a communication unit (12) configured to receive, via a service control device (20) which authenticates an application server (30) providing a service for a communication terminal (50), information relating to a transmittable data amount determined in the application server (30); and a control unit (11) configured to execute, by using the information relating to the transmittable data amount, traffic control on data transmitted from the communication terminal (50).

10 Claims, 13 Drawing Sheets

(51) Int. Cl.
*H04W 12/06* (2021.01)
*H04W 72/04* (2023.01)
*H04L 67/104* (2022.01)
*H04W 28/10* (2009.01)
*H04W 48/00* (2009.01)

(52) U.S. Cl.
CPC ......... *H04W 72/04* (2013.01); *H04L 67/1055* (2013.01); *H04W 28/10* (2013.01); *H04W 48/00* (2013.01)

(58) Field of Classification Search
CPC ....... H04W 72/04–0433; H04W 28/10; H04W 28/12; H04W 4/00; H04W 74/002; H04W 72/1278; H04W 748/00; H04W 748/02; H04L 47/00; H04L 47/125
See application file for complete search history.

(56) References Cited

U.S. PATENT DOCUMENTS

| | | | |
|---|---|---|---|
| 2006/0281417 A1* | 12/2006 | Umesh ................ | H04L 1/0007 455/69 |
| 2014/0242970 A1* | 8/2014 | Yu ...................... | H04W 8/02 455/419 |
| 2015/0282175 A1* | 10/2015 | Dai ................... | H04W 72/0453 370/329 |
| 2016/0337841 A1 | 11/2016 | Won ................... | H04W 24/10 |
| 2017/0048746 A1* | 2/2017 | Rönneke ........... | H04W 28/0289 |
| 2017/0086076 A1 | 3/2017 | Sadek ................ | H04W 76/28 |
| 2018/0084402 A1 | 3/2018 | Kunz ................. | H04L 67/34 |
| 2018/0212710 A1 | 7/2018 | Ronneke ........... | H04W 88/16 |
| 2018/0213391 A1 | 7/2018 | Inque ................ | H04W 8/10 |
| 2019/0028337 A1 | 1/2019 | Ryu .................. | H04W 4/70 |
| 2019/0028866 A1 | 1/2019 | Baek ................. | H04W 4/70 |
| 2019/0053157 A1 | 2/2019 | Lin ................... | H04W 52/0216 |
| 2019/0124671 A1 | 4/2019 | Starsinic ........... | H04W 72/1205 |
| 2019/0335366 A1* | 10/2019 | Jin ................... | H04L 67/141 |
| 2020/0077303 A1 | 3/2020 | Krishan ............. | H04L 47/22 |
| 2022/0303827 A1* | 9/2022 | Zembutsu .......... | H04W 4/20 |

FOREIGN PATENT DOCUMENTS

| | | | | |
|---|---|---|---|---|
| CN | 108632887 | * | 10/2018 | ............ H04W 28/02 |
| CN | 108632887 A | * | 10/2018 | ........ H04W 28/0268 |
| CN | 113573368 A | * | 10/2021 | ............ H04W 28/22 |
| CN | 114554554 A | * | 5/2022 | ............ H04W 28/24 |
| EP | 3820091 A1 | * | 5/2021 | ............. H04L 47/14 |
| JP | 2018-513608 A | | 5/2018 | |
| KR | 102410581 | * | 10/2015 | .......... H04W 72/542 |
| KR | 20170022772 A | | 3/2017 | |
| WO | 2014/181536 A1 | | 11/2014 | |
| WO | 2016/156549 A1 | | 10/2016 | |

OTHER PUBLICATIONS

3GPP TS 23.682, V15.1.0, "3rd Generation Partnership Project; Technical Specification Group Services and System Aspects, Architecture enhancements to facilitate communications with packet data networks and applications (Release 15)," Jun. 2017, 117 pages.

Ericsson et al., "Authorization of efficient small data usage," SA WG2 Meeting #111, S2-153111, Oct. 19-23, 2015, pp. 1-4.

International Search Report of PCT/JP2018/029614 dated Oct. 23, 2018.

Communication dated Jun. 18, 2020, from the European Patent Office in European Application No. 18843704.0.

Ericsson et al., "Predictable UE communication pattern", SA WG2 Meeting #108, S2-151237, Apr. 13-17, 2015, San Jose Del Cabo, Mexico, pp. 1-5 (6 pages total).

Japanese Office Action for JP Application No. 2019-535674 dated Dec. 15, 2020 with English Translation.

3rd Generation Partnership Project; Technical Specification Group Services and System Aspects; Architecture Enhancements for Service Capability Exposure (Release 13), 3GPP, TR23.708, Jun. 2015, pp. 18-19.

Japanese Office Action for JP Application No. 2019-535674 dated Mar. 9, 2021 with English Translation.

* cited by examiner

| GP parameter | Description |
|---|---|
| 1) Periodic communication indicator | Identifies whether the UE communicates periodically or not, e.g. only on demand. [optional] |
| 2) Communication duration time | Duration interval time of periodic communication [optional, may be used together with 1)] Example: 5minutes |
| 3) Periodic time | Interval Time of periodic communication [optional, may be used together with 1)] Example: every hour |
| 4) Scheduled communication time | Time zone and Day of the week when the UE is available for communication [optional] Example: Time: 13:00-20:00, Day: Monday |
| 5) Stationary indication | Identifies whether the UE is stationary or mobile [optional] |
| 6) Quota | |
| 7) Charging policy | |

Fig. 4

CONTROL DEVICE, COMMUNICATION TERMINAL, CONTROL METHOD, NON-TRANSITORY COMPUTER READABLE MEDIUM, MME, AND BASE STATION FOR CONTROLLING A TRANSMISSION RESOURCE USING A COMMUNICATION PATTERN (CP) PARAMETER

CROSS-REFERENCE TO RELATED APPLICATIONS

The present application is a continuation application of U.S. patent application Ser. No. 16/636,809 filed on Feb. 5, 2020, which is a National Stage Entry of international application PCT/JP2018/029614 filed on Aug. 7, 2018, which claims the benefit of priority from Japanese Patent Application No. 2017-153290 filed on Aug. 8, 2017, the disclosures of all of which are incorporated in their entirety by reference herein.

TECHNICAL FIELD

The present disclosure relates to a control device, a communication terminal, a control method, and a program.

BACKGROUND ART

In recent years, there has been studied communication which uses a general mobile network, thus requires no human operation, and is targeted for not only a normal mobile phone, but also a device such as a data terminal, a sensor, a vending machine, or an automobile. A device to be targeted herein is referred to as, for example, an Internet of Things (IoT) terminal, a machine type communication (MTC) terminal, or the like.

An IoT terminal is expected to rapidly increase in the future. Thus, a mobile network is required to efficiently transfer data relating to an IoT terminal, and further avoid generation of congestion or the like. Non Patent Literature 1 discloses that an application server transmits, to a service capability exposure function (SCEF) entity (hereinafter, referred to as an SCEF), information relating to a threshold value of a data amount predetermined for each communication terminal equivalent to an IoT terminal. Moreover, Non Patent Literature 1 discloses that the SCEF performs traffic control, based on a threshold value. Traffic control may be, for example, refusing to transfer data exceeding the threshold value.

CITATION LIST

Non Patent Literature

[Non Patent Literature 1] 3GPP TS 23.682 V 15.1.0 (2017-06) 5.12

SUMMARY OF INVENTION

Technical Problem

The SCEF disclosed in Non Patent Literature 1 is disposed in a core network, and has an interface or a reference point for communicating with an application server. Thus, inflow of a large amount of data from the application server into the core network can be prevented by performing traffic control independently defined by the SCEF. As a result, consumption of a large amount of a resource in the core network can be prevented. However, in the traffic control independently implemented by the SCEF, the SCEF determines, based on the independent definition, transmission refusal of data generated by the application server, and therefore, there is a possibility that the application server performs retransmission of data. As a result, there is a concern that a further increase in traffic is incurred. On the other hand, even when data are transmitted from a communication terminal to the application server, information relating to the traffic control independently defined by the SCEF is previously sent to the communication terminal. Thus, inflow of a large amount of data from the communication terminal into the core network can be prevented. As a result, consumption of a large amount of a resource in the core network can be prevented. However, independent traffic control implemented by the communication terminal is only determination, by the communication terminal, of transmission refusal of data to be transmitted as an application. In this case, a service itself provided by the application may not function normally. Hence, a related art disclosed in Non Patent Literature 1 has a problem that traffic or a data amount transferred on the core network is not controlled in consideration of a traffic characteristic of an application operating between the application server and the communication terminal.

An object of the present disclosure is to provide a control device, a communication terminal, a control method, and a program which can control, in consideration of a traffic characteristic of an application operating between an application server and the communication terminal, traffic or a data amount transferred on a core network.

Solution to Problem

A control device according to a first aspect of the present disclosure includes: a communication unit configured to receive, via a service control device which authenticates an application server providing a service to a communication terminal, information relating to a transmittable data amount determined in the application server; and a control unit configured to execute, by using the information relating to the transmittable data amount, traffic control on data transmitted from the communication terminal.

A communication terminal according to a second aspect of the present disclosure includes: a communication unit configured to receive, via a service control device and a control device which authenticate an application server providing a service to the communication terminal, information relating to a transmittable data amount determined in the application server; and a control unit configured to execute, by using the information relating to the transmittable data amount, traffic control on data to be transmitted.

A control method according to a third aspect of the present disclosure includes: receiving, via a service control device which authenticates an application server providing a service to a communication terminal, information relating to a transmittable data amount determined in the application server; and executing, by using the information relating to the transmittable data amount, traffic control on data transmitted from the communication terminal.

A program according to a fourth aspect of the present disclosure causes a computer to execute: receiving, via a service control device which authenticates an application server providing a service to a communication terminal, information relating to a transmittable data amount determined in the application server; and executing, by using the information relating to the transmittable data amount, traffic control on data transmitted from the communication terminal.

Advantageous Effects of Invention

The present disclosure can provide a control device, a communication terminal, a control method, and a program which can control, in consideration of a traffic characteristic of an application operating between an application server and the communication terminal, traffic or a data amount transferred on a core network.

BRIEF DESCRIPTION OF DRAWINGS

FIG. 4 is a diagram describing a CP parameter according to Example Embodiment 2;

DESCRIPTION OF EMBODIMENTS

Example Embodiment 1

Figure 1:
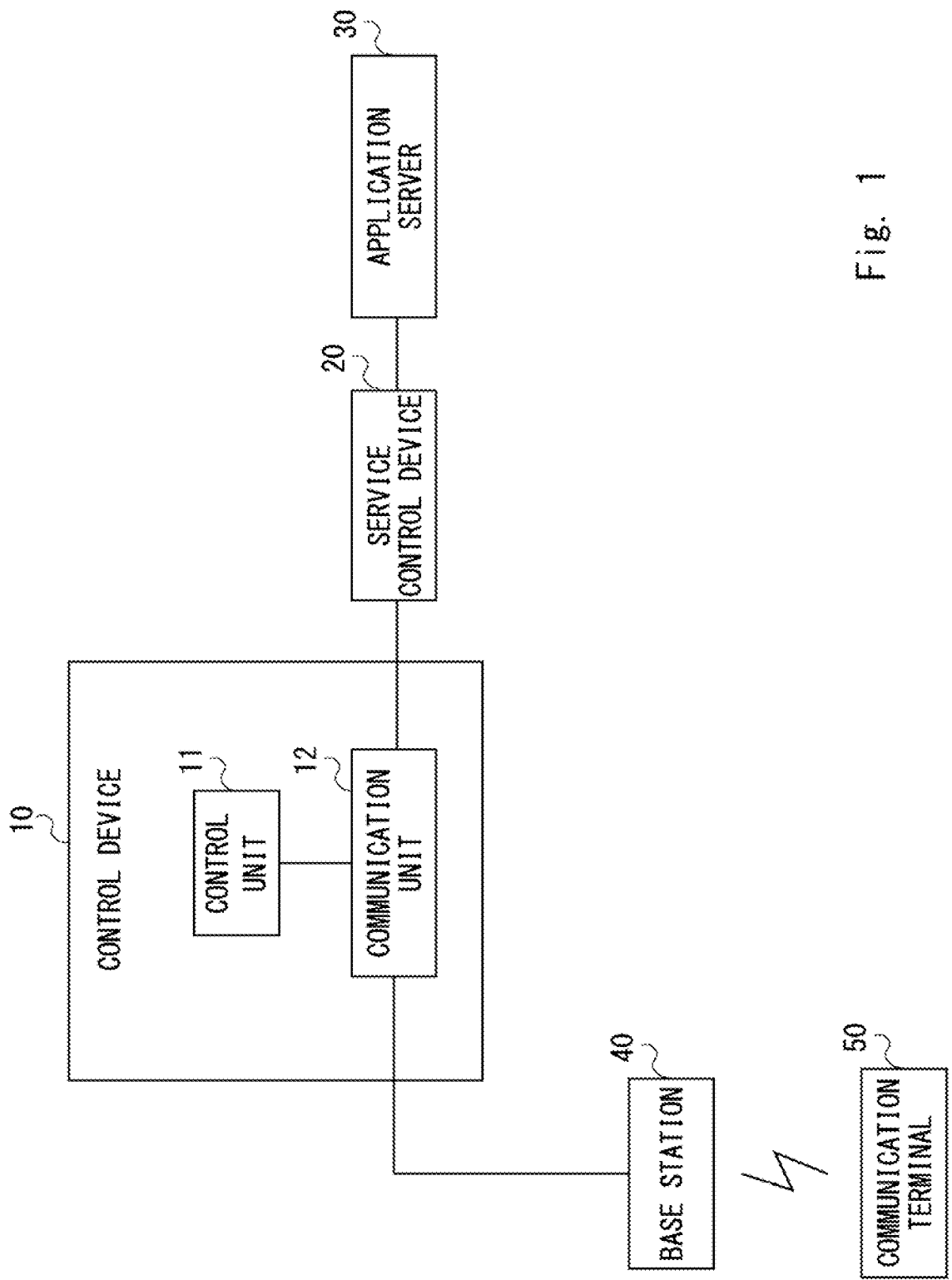
FIG. 1 is a configuration diagram of a communication system according to Example Embodiment 1.

Hereinafter, example embodiments will be described with reference to the drawings. A configuration example of a communication system according to Example Embodiment 1 is described by using FIG. 1. The communication system in FIG. 1 includes a control device 10, a service control device 20, an application server 30, a base station 40, and a communication terminal 50. The control device 10, the service control device 20, the application server 30, the base station 40, and the communication terminal 50 may be computer devices which a processor operates by executing a program stored in a memory. Moreover, the control device 10 and the service control device 20 may be each referred to as a core network device disposed in a core network.

The application server 30 provides a service to the communication terminal 50. The service may be, for example, an application service, and an IoT service, or the like.

The service control device 20 authenticates the application server 30. Specifically, the service control device 20 may determine whether or not the application server 30 is an application server permitted to provide a service to the communication terminal 50. For example, the service control device 20 may hold list information of an application server permitted to provide a service to the communication terminal 50.

The service control device 20 is disposed in a mobile network including the control device 10 and the base station 40, and performs communication with the application server 30 disposed outside the mobile network. It can also be said that the service control device 20 is disposed in the core network together with the control device 10, and performs communication with the application server 30 disposed outside the core network.

Now, a configuration example of the control device 10 is described. The control device 10 includes a control unit 11 and a communication unit 12. A component configuring the control device 10, such as the control unit 11 and the communication unit 12, may be software or a module with which a processor executes processing by executing a program stored in a memory. Alternatively, a component configuring the control device 10 may be hardware such as a circuit or a chip.

The communication unit 12 receives, via the service control device 20, information relating to a transmittable data amount determined in the application server 30. Information relating to a transmittable data amount may be, for example, a rate quota, a byte quota, rate control, or a charging policy. Alternatively, information relating to a transmittable data amount may include more than one of a rate quota, a byte quota, rate control, or a charging policy. A rate quota, a byte quota, and rate control are information indicating a data amount transmittable by the communication terminal 50 in a predetermined period, or information indicating the number of messages for transferring data. Moreover, a rate quota, a byte quota, and rate control may include a data amount receivable by the communication terminal 50 in a predetermined period, or information relating to the number of messages for receiving data. A predetermined period may be, for example, one month, one week, one day, one hour, or the like. A rate quota and a byte quota may be each represented as an APN rate. A charging policy may be information relating to a remaining transmittable data amount when the communication terminal 50 is a prepaid-compatible terminal, and an upper limit value of a transmittable data amount is determined. Moreover, uplink data, downlink data, and a rated value specific to each piece of information may be set for a rate quota, a byte quota, and rate control. Uplink data are data transferred from the communication terminal 50 toward the application server 30. Downlink data are data transferred from the application server 30 toward the communication terminal 50. Hereinafter, four pieces of information including a rate quota for uplink data, a rate quota for downlink data, a byte quota for uplink data, and a byte quota for downlink data may be collectively represented as a quota. Note that information relating to a transmittable data amount may include a tariff. The tariff may include information relating to a transmittable data amount, the number of transmittable messages, a receivable data amount, or the number of receivable messages.

Information relating to a transmittable data amount differs depending on a service provided by the application server 30. Thus, the application server 30 determines a transmittable data amount for each communication terminal 50. Note that the application server 30 is disposed outside the mobile network. In other words, the application server 30 may be managed by a carrier differing from a carrier managing the mobile network. Thus, from the perspective of security and the like, the control device 10 does not directly receive information relating to a transmittable data amount from the application server 30, but receives information relating to a transmittable data amount from the application server 30 via the service control device 20. As described above, the service control device 20 can determine whether information from the application server 30 is reliable, by having a function of authenticating the application server 30.

The control unit 11 executes, by using information relating to a transmittable data amount, traffic control on data transmitted from the communication terminal 50. Traffic control may be achieved by fine-tuning, to an appropriate value, a transmission rate applied to transmission of data, based on information relating to a transmittable data amount. In this case, the control unit 11 may raise or lower, from a current value, a transmission rate applied to transmission of data exceeding the transmittable data amount, in such a way as to satisfy the transmittable data amount. Moreover, traffic control may be refusing transmission of data exceeding the transmittable data amount, when a total of data transmitted from the communication terminal 50 exceeds the transmittable data amount. In such a case, the control unit 11 may not perform transmission of data exceeding the transmittable data amount. Alternatively, traffic control may lower, from a current value, a transmission rate applied to transmission of data exceeding the transmittable data amount, when a total of data transmitted from the communication terminal 50 exceeds the transmittable data amount.

As described above, the control device 10 according to Example Embodiment 1 can receive, via the service control device 20, information relating to a transmittable data amount determined in the application server 30. Further, the control device 10 can execute, by using the received information relating to the transmittable data amount, traffic control on data transmitted from the communication terminal 50. As a result, in a mobile network, traffic or a data amount transferred on a core network can be controlled, in consideration of a traffic characteristic of an application operating between the application server 30 and the communication terminal 50. By performing such control, the control device 10 according to Example Embodiment 1 can reduce a possibility of occurrence of a problem that a service itself provided by the application fails to operate. The problem that a service itself provided by the application fails to operate is caused by performing traffic control which does not consider a traffic characteristic of an application operating between the application server 30 and the communication terminal 50.

Furthermore, the function of the control device 10 described in FIG. 1 may be installed in the base station 40. In other words, the base station 40 may receive information relating to a transmittable data amount from the service control device 20, and perform traffic control, based on the received information relating to the transmittable data amount.

Example Embodiment 2

Figure 2:
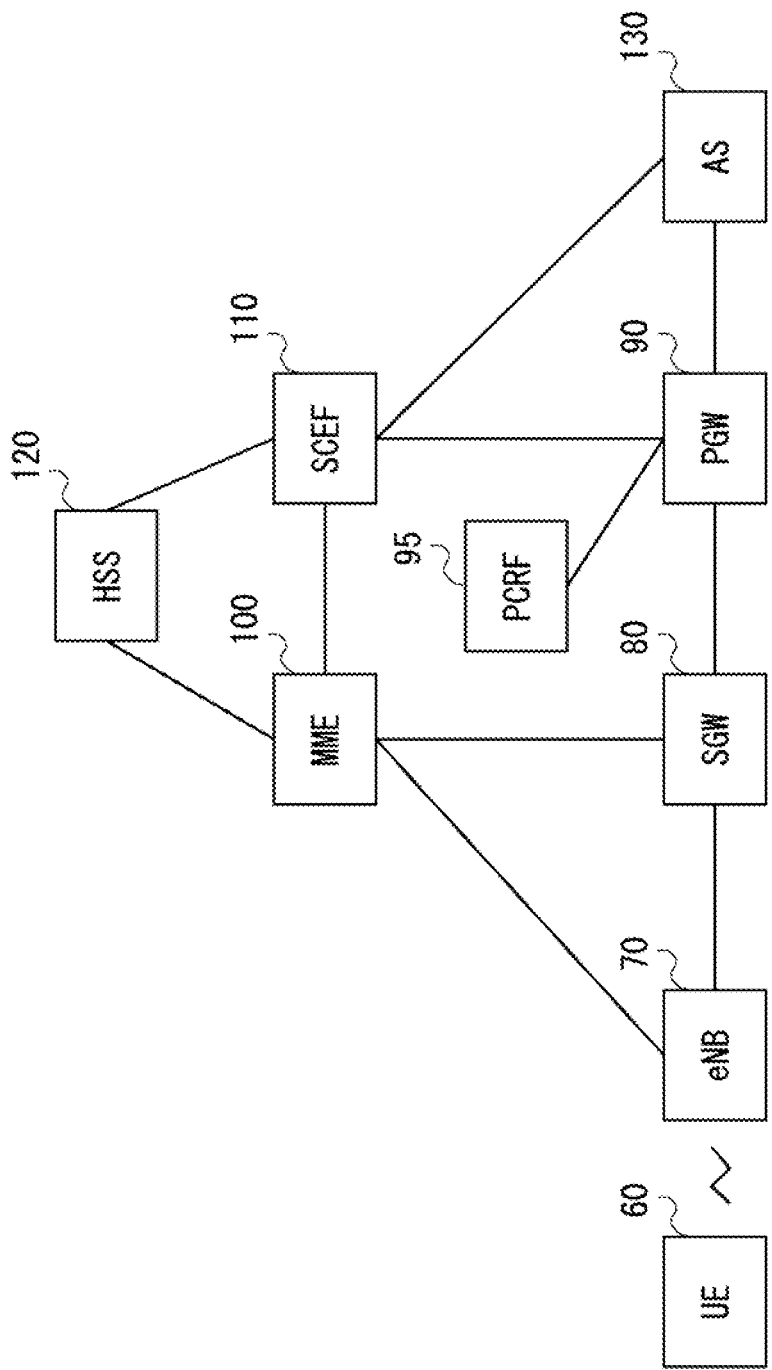
FIG. 2 is a configuration diagram of a communication system according to Example Embodiment 2.

Now, a configuration diagram of a communication system according to Example Embodiment 2 is described by using FIG. 2. The communication system in FIG. 2 includes user equipment (UE) 60, an evolved Node B (eNB) 70, a serving gateway (SGW) 80, a packet data network gateway (PGW) 90, a policy and charging rules function (PCRF) entity 95 (hereinafter, referred to as a PCRF 95), a mobility management entity (MME) 100, a service capability exposure function (SCEF) entity 110 (hereinafter, referred to as an SCEF 110), a home subscriber server (HSS) 120, and an application server (AS) 130.

The SGW 80, the PGW 90, the PCRF 95, the MME 100, the SCEF 110, and the HSS 120 are node devices configuring an evolved packet core (EPC). The EPC is equivalent to a core network. Moreover, the SGW 80, the PGW 90, and the MME 100 are equivalent to a control device 10 in FIG. 1.

The UE 60 is a generic term of a communication terminal in 3GPP, and is equivalent to a communication terminal 50 in FIG. 1. The UE 60 may be an IoT terminal or an MTC terminal. The eNB 70 is a base station which supports long term evolution (LTE) as a wireless communication method, and is equivalent to a base station 40 in FIG. 1. The UE 60 performs, for example, wireless communication using the eNB 70 and LTE.

The SGW 80 is disposed between the eNB 70 and the PGW 90, and relays user data. User data may be referred to as user (U)—plane data. The PGW 90 is a gateway to an external network differing from the EPC, and performs communication with the AS 130 disposed on the external network. The external network may be, for example, a network managed by a carrier such as an application provider, or a packet data network (PDN). The PGW 90 is disposed between the AS 130 and the SGW 80, and relays user data. The SGW 80 and the PGW 90 may execute traffic control on user data transmitted from the UE 60.

The MME 100 performs management and control of mobility of the UE 60. The MME 100 is connected to the eNB 70. The MME 100 relays control data between a node device in the core network, and the eNB 70. Alternatively, the MME 100 transmits control data generated in the local device to the eNB 70 or the node device in the core network. Control data may be referred to as control (C)—plane data. Moreover, it is known that data used for an IoT service transferred between the UE 60 and the AS 130 has a small capacity and data size, as compared with general user data. Thus, data used for an IoT service may be transferred as control data between the AS 130 and the UE 60 via the SCEF 110, the MME 100, and the eNB 70. Data used for an IoT service may be referred to as, for example, small data. The MME 100 may execute traffic control on small data transmitted as control data from the UE 60. The MME 100 receives, via the SCEF 110, information relating to a transmittable data amount determined in an application server 30. Then, the MME 100 executes traffic control on the data transmitted from the UE 60, by using information relating to a transmittable data amount.

The SCEF 110 executes authentication or the like relating to the AS 130 disposed on the external network. Further, the SCEF 110 transmits, to the AS 130, a parameter relating to the UE 60. The parameter relating to the UE 60 may be, for example, a parameter required for the AS 130 to provide a service to the UE 60. The SCEF 110 is equivalent to a service control device 20 in FIG. 1. The SCEF 110 is disposed between the MME 100 and the AS 130.

The HSS 120 manages subscriber information (UE subscription information, a UE usage type, or the like) relating to the UE 60. The HSS 120 connects to the MME 100 and the SCEF 110.

The AS 130 determines a transmittable data amount relating to the UE 60, specifically, at least one of a quota, rate control, and a charging policy. The AS 130 determines at least one of a quota, rate control, and a charging policy for each UE. Note that a service capability server (SCS) may be used instead of the AS, and the servers may be referred to as an SCS/AS. The AS 130 transmits the determined transmittable data amount to the MME 100 via the SCEF 110. Note that the AS 130 (or the SCS) may determine a tariff, and transmit the tariff to the MME 100 via the SCEF 110.

Figure 3:
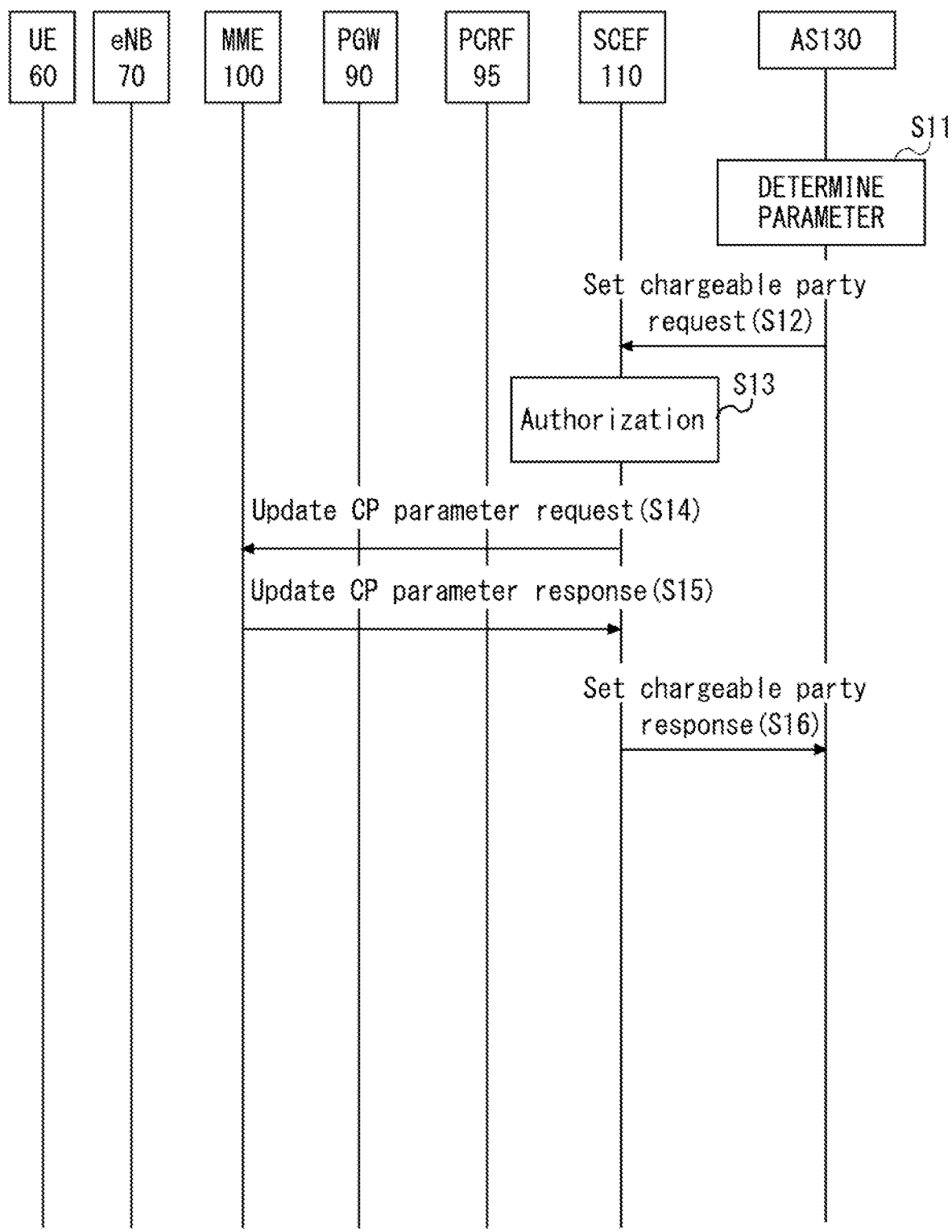
FIG. 3 is a diagram illustrating flow of processing of sending information relating to a transmission data amount according to Example Embodiment 2.

Now, flow of processing of sending information relating to a transmission data amount according to Example Embodiment 2 is described by using FIG. 3. First, the AS 130 determines, as a parameter relating to the UE 60, at least one of a quota, rate control, and a charging policy (S11). Note that the AS 130 may determine a tariff.

Next, the AS 130 transmits, to the SCEF 110, a set chargeable party request message in which the parameter determined in step S11 is set (S12). Specifically, a quota, rate control, and a charging policy may be set in the set chargeable party request message as a CP parameter. Rate control in this case is data control suggested by the AS 130 on a core network. Herein, an example of a CP parameter is described by using FIG. 4. Note that, when the AS 130 determines a tariff, the tariff may be set in the set chargeable party request message.

A CP parameter includes a periodic communication indicator, a communication duration time, a periodic time, a scheduled communication time, and a stationary indication. Further, a quota, rate control, and a charging policy may be added to the CP parameter. The AS 130 may determine a value of at least one of the quota, the rate control, and the charging policy, and set the determined value in the set chargeable party request message as a CP parameter. Moreover, the AS 130 may set, in the set chargeable party request message, only a changed parameter, out of the periodic communication indicator, the communication duration time, the periodic time, the scheduled communication time, the stationary indication, the quota, the rate control, and the charging policy. Note that the AS 130 may determine a tariff, and include the tariff in the CP parameter.

Returning to FIG. 3, the SCEF 110 authenticates the set chargeable party request message, in order to ensure application traffic relating to the AS 130 (S13). Next, the SCEF 110 sets the parameter determined in step S11 in an update CP parameter request message as a CP parameter, and transmits the CP parameter to the MME 100 (S14). Herein, the MME 100 may hold the CP parameter set in the update CP parameter request message. Thereafter, the MME 100 transmits an update CP parameter response message to the SCEF 110 (S15). Next, the SCEF 110 transmits a set chargeable party response message to the AS 130 (S16). Note that the AS 130 may set the CP parameter determined in step S11 to a message differing from the set chargeable party request message, and then transmit the message to the SCEF 110. The SCEF 110 may set the CP parameter to a message differing from the update CP parameter request message, and then transmit the message to the MME 100. For example, a T 8 set suggested network configuration request message may be used instead of the set chargeable party request message. A set suggested network configuration request message may be used instead of the update CP parameter request message. Moreover, a set suggested network configuration response message may be used instead of the update CP parameter response message. A T 8 set suggested network configuration response message may be used instead of the set chargeable party response message.

The MME 100 performs traffic control relating to user data transferred as control data transmitted from the UE 60 to the AS 130, by using at least one of a quota, rate control, and a charging policy relating to the UE 60. User data transferred as control data targeted for traffic control may be, for example, IoT data, small data, or the like. Note that, when receiving a tariff, the MME 100 may perform traffic control in consideration of the tariff.

The MME 100 may perform traffic control relating to user data being transferred as control data transmitted from the UE 60, and being transferred as control data addressed to the AS 130. Further, the SCEF 110 may perform traffic control relating to user data being transferred as control data transmitted from the AS 130, and being transferred as control data addressed to the UE 60. In other words, the MME 100 may perform traffic control in relation to uplink data, and the SCEF 110 may perform traffic control in relation to downlink data. Thus, traffic or a data amount transferred in a core network can be reduced. Moreover, CP parameter relating to uplink data, and CP parameter relating to downlink data may be set to differing values. Thus, traffic control suited to each of uplink data and downlink data can be performed.

Furthermore, the MME 100 may transmit, to the eNB 70, at least one of a quota, rate control, and a charging policy that has been held. For example, the MME 100 may set at least one of a quota, rate control, and a charging policy in a UE context setup request message or a handover request message being a message transmitted to the eNB 70. In this case, instead of the MME 100, the eNB 70 can perform traffic control relating to data transmitted from the UE 60 to the AS 130. The eNB 70 may perform traffic control relating to user data transmitted from the UE 60 to the AS 130, in addition to control data transmitted from the UE 60 to the AS 130. Alternatively, the eNB 70 may only perform traffic control of either control data or user data. Note that when receiving a tariff, the MME 100 may transmit the tariff to the eNB 70. In this case, the eNB 70 may perform traffic control in consideration of the tariff.

Furthermore, the MME 100 may transmit, to the UE 60, at least one of a quota, rate control, and a charging policy that has been held. For example, in attach processing or tracking area update (TAU) processing, the MME 100 may set at least one of a quota, rate control, and a charging policy in a message transmitted to the UE 60. In this case, instead of the MME 100, the UE 60 may perform traffic control relating to data transmitted to the AS 130. The UE 60 may perform traffic control relating to user data transmitted to the AS 130, in addition to control data transmitted to the AS 130. Alternatively, the UE 60 may only perform traffic control of either control data or user data. Note that, when receiving a tariff, the MME 100 may transmit the tariff to the UE 60. In this case, the UE 60 may perform traffic control in consideration of the tariff.

Figure 5:
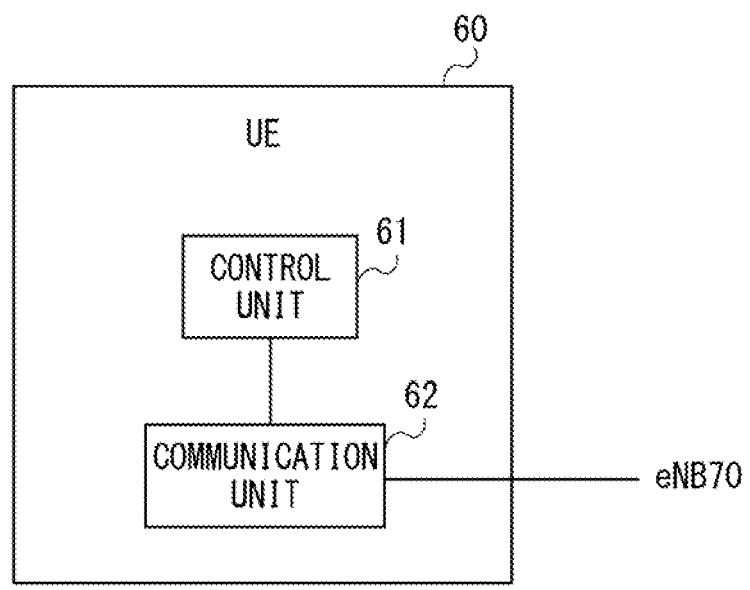
FIG. 5 is a configuration diagram of UE according to Example Embodiment 2.

For example, as illustrated in FIG. 5, the UE 60 includes a control unit 61 and a communication unit 62. A component configuring the UE 60, such as the control unit 61 and the communication unit 62, may be software or a module with which a processor executes processing by executing a program stored in a memory. Alternatively, a component configuring the UE 60 may be hardware such as a circuit or a chip.

The communication unit 62 receives at least one of a quota, rate control, and a charging policy. Further, when transmitting data to the eNB 70, the control unit 61 performs traffic control for at least either control data or user data by using at least one of the received a quota, rate control, and charging policy. Note that, when receiving a tariff, the communication unit 62 may perform traffic control in consideration of the tariff.

As described above, the MME 100 according to Example Embodiment 2 can receive, from the SCEF 110, at least one of a quota, rate control, and a charging policy. Further, the MME 100 can perform traffic control relating to control data transmitted from the UE 60 to the AS 130, by using at least one of a quota, rate control, and a charging policy. Note that, when receiving a tariff, the MME 100 can perform traffic control in consideration of the tariff. Owing to this characteristic, the MME 100 according to Example Embodiment 2 can perform traffic control relating to control data, in consideration of a traffic characteristic of an application operating between the AS 130 and the UE 60. By performing such control, the MME 100 according to Example Embodiment 2 can reduce a possibility of occurrence of a problem that a service itself provided by the application fails to operate. The problem that a service itself provided by the application fails to operate is caused by performing traffic control which does not consider a traffic characteristic of an application operating between the AS 130 and the UE 60.

Furthermore, the MME 100 may transmit, to the eNB 70 or the UE 60, at least one of a quota, rate control, and a charging policy, and the eNB 70 or the UE 60 may perform traffic control relating to control data transmitted from the UE 60 to the AS 130.

Now, a modification example of Example Embodiment 2 is described. Flow of processing of sending information relating to a transmission data amount according to the modification example of Example Embodiment 2 is described by using FIG. 6. First, the AS 130 determines, as a parameter relating to the UE 60, at least one of a quota, rate control, and a charging policy (S11_1). Note that each of the parameters may include a tariff in the following description as in Embodiment 2, and details thereof are omitted.

Next, the AS 130 transmits, to the SCEF 110, an NIDD configuration request message in which the parameter determined in step S 11_1 is set (S12_1). The NIDD configuration request message may be a T 8 set suggested network configuration request message. Rate control set in the NIDD configuration request message (S12_1) is data control suggested by the AS 130 on a core network.

The SCEF 110 holds, as management data for the UE 60, the quota, the rate control, and the charging policy set in the NIDD configuration request message (S12_1) (S13_1).

The SCEF 110 transmits, to the HSS 120, an NIDD authorization request message in which at least one of the quota, the rate control, and the charging policy is set as a parameter (S14_1). The quota, the rate control, and the charging policy are set in the NIDD configuration request message (S12_1). The NIDD authorization request message may be a set suggested network configuration request message.

The HSS 120 holds, as subscriber data for the UE 60, at least one of a quota, rate control, and a charging policy relating to the UE 60. The HSS 120 transmits an NIDD authorization response message to the SCEF 110 (S15_1). At least one of a quota, rate control, and a charging policy relating to the UE 60 updated by the HSS 120 may be set in the NIDD authorization response message (S15_1). The HSS 120 may set a cause indicating a fact (reject) of being unable to receive at least one or all of the quota, the rate control, and the charging policy set in the NIDD authorization request message (S14_1). The NIDD authorization response message may be a set suggested network configuration response message.

The SCEF 110 transmits an NIDD configuration response message to the AS 130 (S16_1). At least one of the quota, the rate control, and the charging policy relating to the UE 60 updated by the HSS 120 may be set in the NIDD configuration response message (S16_1). The SCEF 110 may set a cause indicating a fact (reject) of being unable to receive at least one or all of the quota, the rate control, and the charging policy set in the NIDD configuration request message (S12_1). The NIDD configuration request message may be a T 8 set suggested network configuration response message.

As described above, the HSS 120 according to the modification example of Example Embodiment 2 can receive, from the SCEF 110, at least one of a quota, rate control, and a charging policy. Further, through movement management of the UE 60 operating after completion of this operation, and session management, the HSS 120 becomes able to send at least one of the quota, the rate control, and the charging policy to the SCEF 110, the PGW 90, and the UE 60. Moreover, the HSS 120 can perform, in consideration of a traffic characteristic of an application operating between the AS 130 and the UE 60, traffic control relating to data transmitted from the UE 60 to the AS 130, and user data transmitted from the AS 130 to the UE 60. When sending at least one of the quota, the rate control, and the charging policy to the SCEF 110, the HSS 120 may use an insert subscriber data request message. Moreover, when sending at least one of the quota, the rate control, and the charging policy to the UE 60, the HSS 120 may send via the SCEF 110 by using protocol configuration option (PCO). By performing traffic control in consideration of a traffic characteristic of an application operating between the AS 130 and the UE 60, the SCEF 110, the PGW 90, and the UE 60 according to the modification example of Example Embodiment 2 can reduce a possibility of occurrence of a problem that a service itself provided by the application fails to operate. The problem that a service itself provided by the application fails to operate is caused by performing traffic control which does not consider a traffic characteristic of an application operating between the AS 130 and the UE 60.

Additionally, the MME 100 may transmit, to the eNB 70 or the UE 60, at least one of a quota, rate control, and a charging policy, and the eNB 70 or the UE 60 may perform traffic control relating to user data transmitted from the UE 60 to the AS 130.

Figure 6:
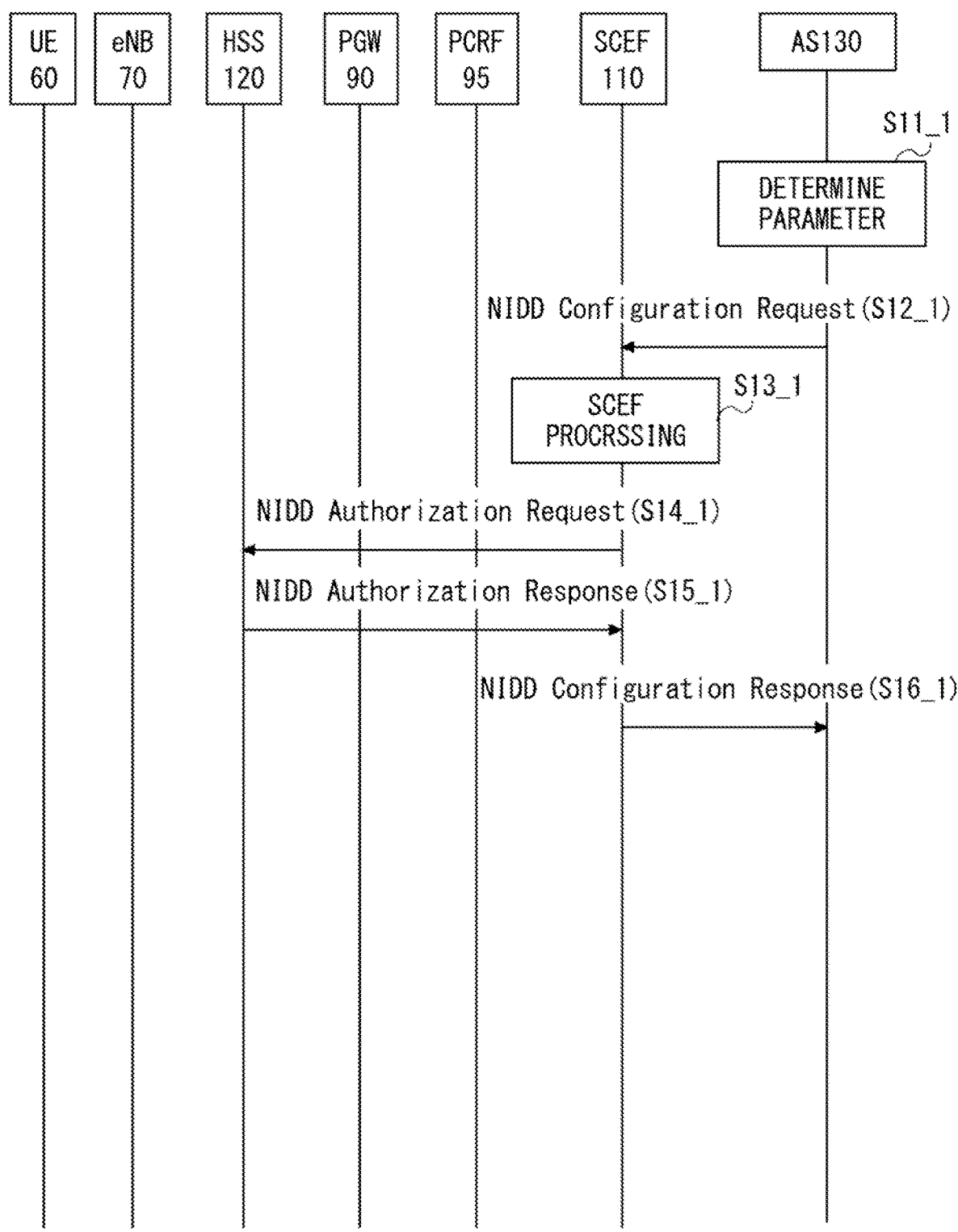
FIG. 6 is a diagram illustrating flow of processing of sending information relating to a transmission data amount according to a modification example of Example Embodiment 2.

Furthermore, although the above description mainly describes a configuration using LTE as a wireless communication method and using EPC as a core network, processing in FIGS. 3 and 6 may be executed in a communication system so called 3G in 3GPP. Specifically, in a communication system called 3G, a node B (NB) is used instead of an eNB, and a serving general packet radio service support node (SGSN) is used instead of an MME. Further, in a communication system called 3G, a gateway general packet radio service support node (GGSN) is used instead of a PGW, and a home location register (HLR) is used instead of an HSS. In the following description as well, a communication system of 3G may be used.

Example Embodiment 3

Figure 7:
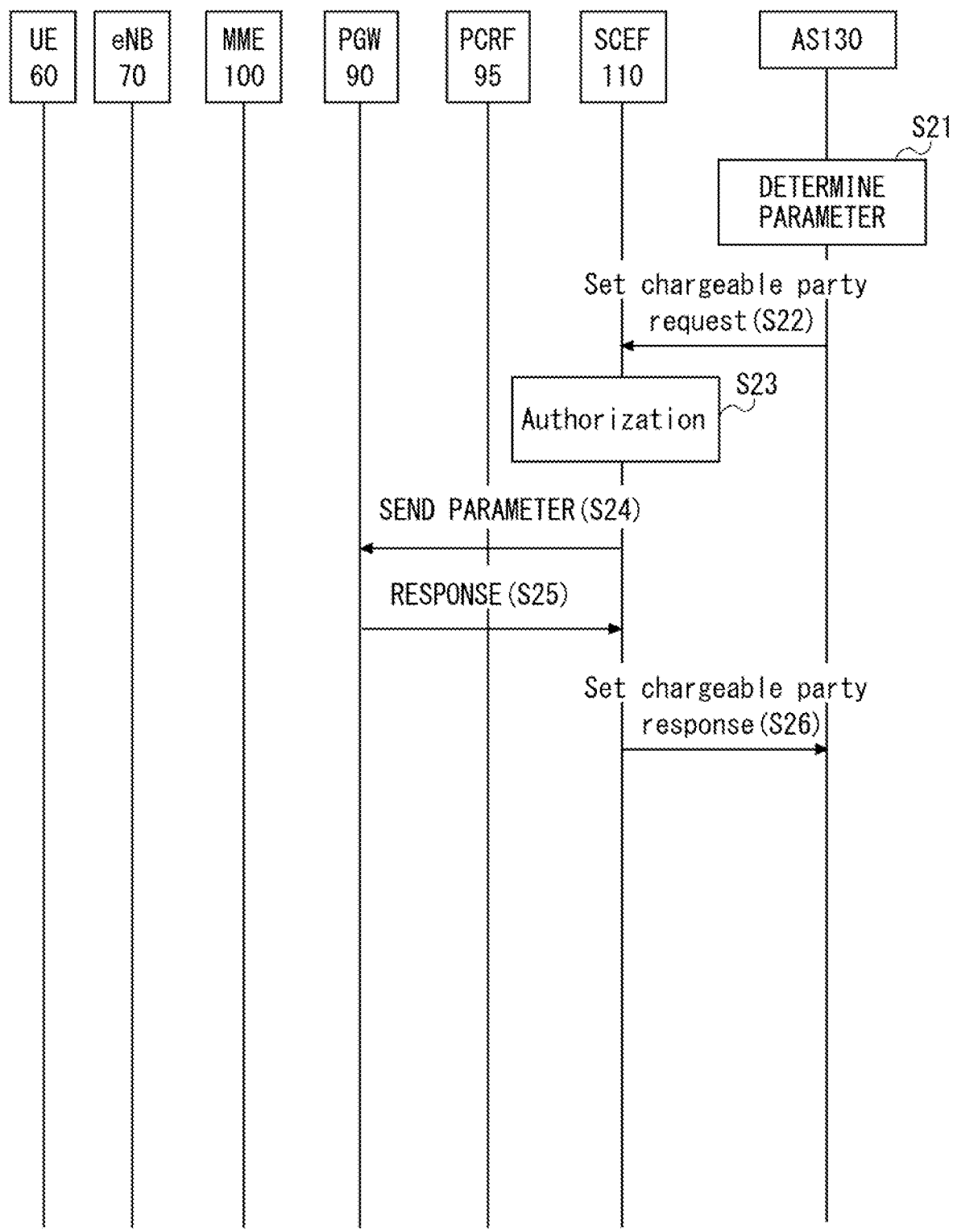
FIG. 7 is a diagram illustrating flow of processing of sending information relating to a transmission data amount according to Example Embodiment 3.

Now, flow of processing of sending information relating to a transmission data amount according to Example Embodiment 3 is described by using FIG. 7. Steps S 21 to S 23 are similar to steps S 11 to S 13 in FIG. 3, and therefore, detailed description thereof is omitted.

When authenticating an AS 130 in Step S 23, an SCEF 110 sends, to a PGW 90, a parameter being set in a set chargeable party request message, and being determined in step S 21 (S24). The PGW 90 holds the received parameter. Thereafter, the PGW 90 transmits a response message to the SCEF 110 (S25). Next, the SCEF 110 transmits a set chargeable party response message to the AS 130 (S26).

The PGW 90 performs traffic control relating to user data transmitted from UE 60 to the AS 130, by using at least one of a quota, rate control, and a charging policy relating to the UE 60. User data targeted for traffic control may be, for example, IoT data. Further, the PGW 90 may perform traffic control relating to user data transmitted from the AS 130 to the AS UE 60.

Furthermore, the PGW 90 may transmit, to an SGW 80, at least one of a quota, rate control, and a charging policy that has been held. In this case, the SGW 80, instead of the PGW 90, may perform traffic control relating to data transmitted from the AS UE 60 to the AS 130, and the PGW 90 may perform traffic control relating to data transmitted from the AS 130 to the AS UE 60.

As described above, the PGW 90 according to Example Embodiment 3 can receive, from the SCEF 110, at least one of a quota, rate control, and a charging policy. Further, the PGW 90 or the SGW 80 can perform traffic control relating to user data transmitted from the UE 60 to the AS 130, by using at least one of a quota, rate control, and a charging policy. Traffic control relating to user data transmitted from the UE 60 to the AS 130 is performed in consideration of a traffic characteristic of an application operating between the AS 130 and the UE 60. By performing traffic control in consideration of a traffic characteristic of an application operating between the AS 130 and the UE 60, the PGW 90 according to Example Embodiment 3 can reduce a possibility of occurrence of a problem that a service itself provided by the application fails to operate. The problem that a service itself provided by the application fails to operate is caused by performing traffic control which does not consider a traffic characteristic of an application operating between the AS 130 and the UE 60.

Example Embodiment 4

Figure 8:
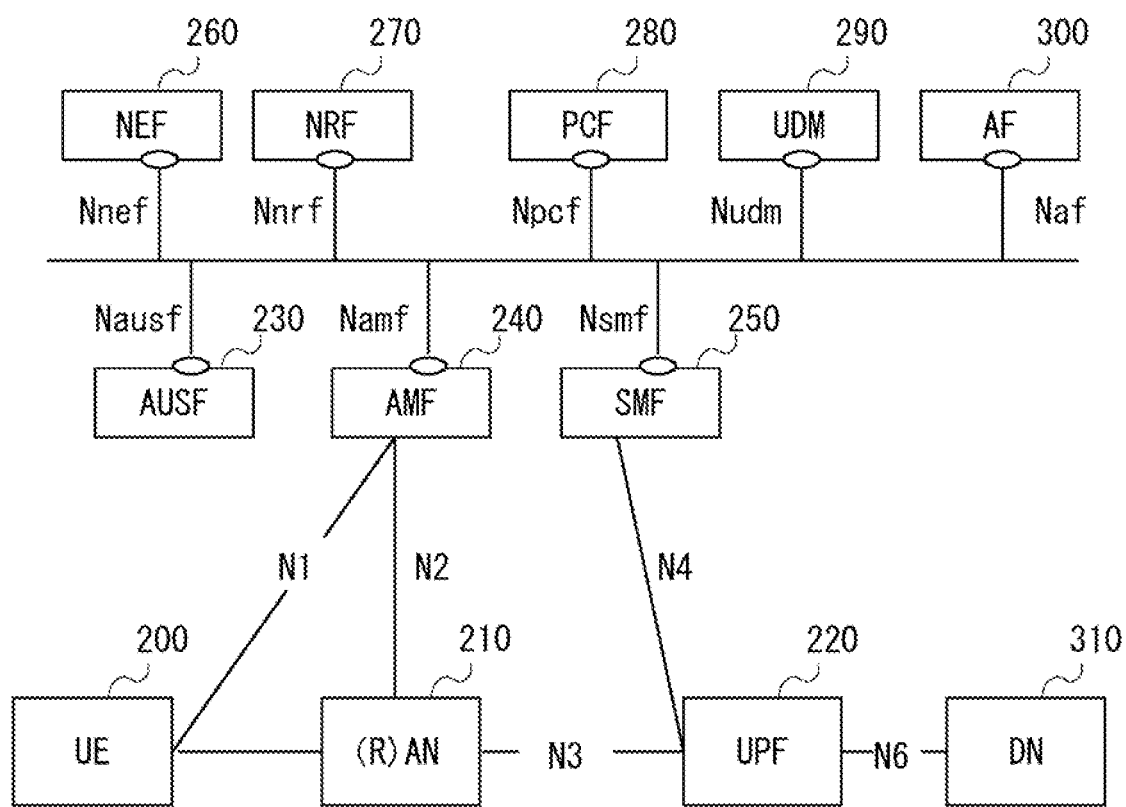
FIG. 8 is a configuration diagram of a communication system according to Example Embodiment 4.

Now, a configuration example of a communication system according to Example Embodiment 4 is described by using FIG. 8. The communication system in FIG. 8 refers to 3GPP TS 23.501 V 0.5.0 (2017-05) FIG. 4.2.3_1, and mainly illustrates a configuration of 5G core (5GC). The communication system in FIG. 8 includes UE 200, an access network (AN) 210, a user plane function (UPF) entity 220 (hereinafter, referred to as a UPF 220), an authentication server function (AUSF) 230, an access and mobility management function (AMF) entity 240 (hereinafter, referred to as an AMF 240), a session management function (SMF) entity 250 (hereinafter, referred to as an SMF 250), a network exposure function (NEF) entity 260 (hereinafter, referred to as an NEF 260), a network repository function or network functions repository function (NRF) entity 270 (hereinafter, referred to as an NRF 270), a policy control function (PCF) entity 280 (hereinafter, referred to as a PCF 280), a unified data management (UDM) 290, an application function (AF) entity 300 (hereinafter, referred to as an AF 300), and a data network (DN) 310. The AN 210 may be indicated as a (radio (R)) AN 210.

The UE 200 is equivalent to UE 60 in FIG. 2. The AN 210 includes a base station or the like communicating with the UE 200. The AN 210 may perform wireless communication or wired communication with the UE 200. The base station or the like included in the AN 210 is equivalent to an eNB 70 in FIG. 2.

The UPF 220 is disposed between the AN 210 and the DN 310 being an external network. The UPF 220 performs routing or transfer of user data between the AN 210 and the DN 310. The UPF 220 is equivalent to an SGW 80 and a PGW 90 in FIG. 2.

The AMF 240 performs mobility management relating to the UE 200, and authentication processing relating to the UE 200 in cooperation with the AUSF 230 and the like. The SMF 250 manages a session established when user data are transferred between the UE 200 and the DN 310. The AMF 240 and the SMF 250 are equivalent to an MME 100 in FIG. 2.

The PCF 280 manages a policy rule applied in the communication system in FIG. 8. The UDM 290 manages subscriber information (UE subscription or subscription information). The UDM 290 is equivalent to an HSS 120 in FIG. 2.

The AF 300 provides an application service to the UE 200. The AUSF 230 performs authentication relating to the UE 200 in cooperation with the AMF 240 and the UDM 290.

The NEF 260 executes authentication processing and the like relating to the AF 300 disposed on an external network. Further, the NEF 260 transmits, to the AF 300, a parameter relating to the UE 200. The NEF 260 is equivalent to an SCEF 110 in FIG. 2. The NRF 270 manages information relating to a service that can be provided to the UE 200. The DN 310 indicates that the network is an external network differing from a core network.

Furthermore, an N 1 is determined as a reference point between the UE 200 and the AMF 240. An N 2 is determined as a reference point between the AN 210 and the AMF 240. An N 3 is determined as a reference point between the AN 210 and the UPF 220. An N 4 is determined as a reference point between the UPF 220 and the SMF 250. An N 6 is determined as a reference point between the UPF 220 and the DN 310.

Additionally, the AUSF 230, the AMF 240, the SMF 250, the NEF 260, the NRF 270, the PCF 280, the UDM 290, and the AF 300 each determine a service-based interface. The service-based interface indicates, for example, a service, a function, or the like provided in each device.

The service-based interface determined in the AUSF 230 is represented as Nausf. The service-based interface determined in the AMF 240 is represented as Namf. The service-based interface determined in the SMF 250 is represented as Nsmf. The service-based interface determined in the NEF 260 is represented as Nnef. The service-based interface determined in the NRF 270 is represented as Nnrf. The service-based interface determined in the PCF 280 is represented as Npcf. The service-based interface determined in the UDM 290 is represented as Nudm. The service-based interface determined in the AF 300 is represented as Naf.

Figure 9:
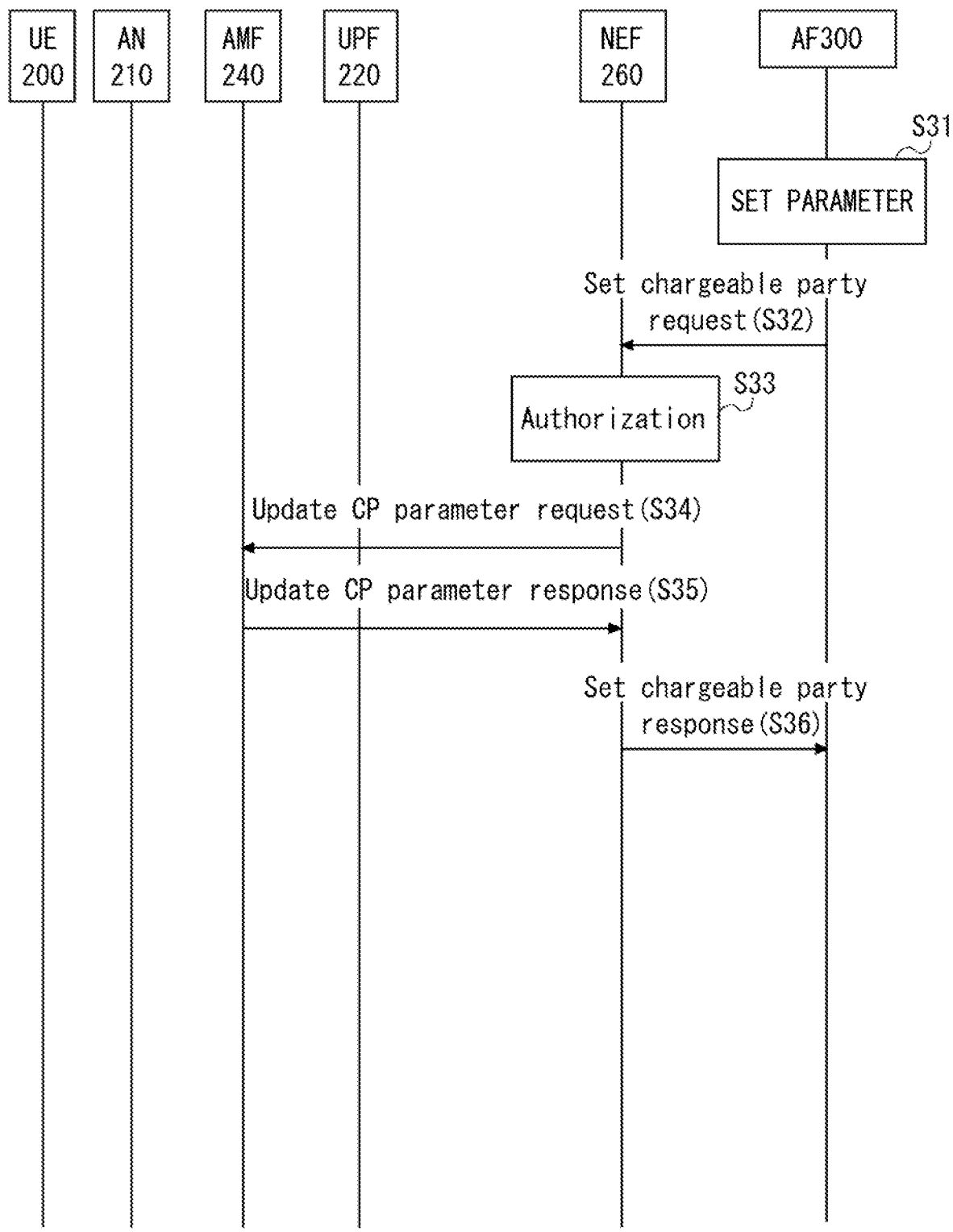
FIG. 9 is a diagram illustrating flow of processing of sending information relating to a transmission data amount according to Example Embodiment 4.

Now, flow of processing of sending information relating to a transmission data amount according to Example Embodiment 4 is described by using FIG. 9. FIG. 9 illustrates that processing in FIG. 3 is executed in the communication system illustrated in FIG. 8. In other words, FIG. 9 illustrates that each piece of processing in FIG. 3 is executed by using 5GC in FIG. 8. Steps S 31 to S 36 in FIG. 9 are similar to steps S 11 to S 16 in FIG. 3, and therefore, detailed description thereof is omitted.

Furthermore, although FIG. 9 illustrates that the same signal as that in FIG. 3 is used, a name of a signal may be changed. Moreover, a signal transferred between the AMF 240 and the NEF 260 may be transferred via the PCF 280. For example, an update CP parameter request message in step S 34 and an update CP parameter response message in step S 35 may be transferred via the PCF 280.

Furthermore, the AMF 240 may transmit, to the AN 210, at least one of a quota, rate control, and a charging policy that has been held. For example, the AMF 240 may set at least one of a quota, rate control, and a charging policy in a message transmitted to the AN 210. In this case, instead of the AMF 240, the AN 210 may perform traffic control relating to data transmitted from the UE 200 to the AF 300. The AN 210 may perform traffic control relating to user data transmitted from the UE 200 to the AF 300, in addition to control data transmitted from the UE 200 to the AF 300. The control data transmitted from the UE 200 to the AF 300 may be user data transferred as control data. Alternatively, the AN 210 may only perform traffic control of either control data or user data.

Furthermore, the AMF 240 may transmit, to the UE 200, at least one of a quota, rate control, and a charging policy that has been held. For example, in attach processing or tracking area update (TAU) processing, the AMF 240 may set at least one of a quota, rate control, and a charging policy in a message transmitted to the UE 200. In this case, instead of the AMF 240, the UE 200 may perform traffic control relating to data transmitted to the AF 300. The UE 200 may perform traffic control relating to user data transmitted to the AF 300, in addition to control data transmitted to the AF 300. Alternatively, the UE 200 may only perform traffic control of either control data or user data.

Figure 10:
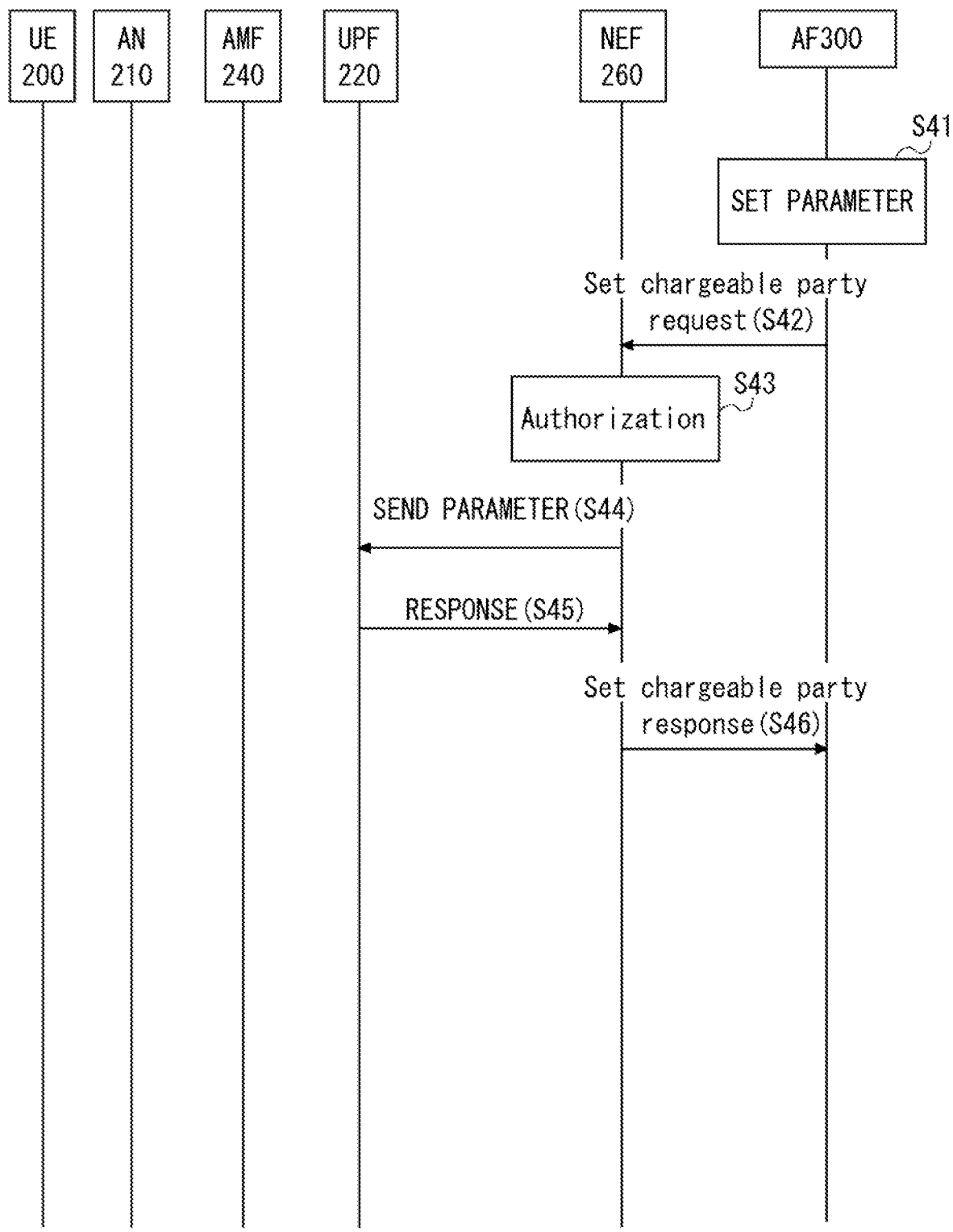
FIG. 10 is a diagram illustrating flow of processing of sending information relating to a transmission data amount according to Example Embodiment 4.

Furthermore, in order for the UPF 220 to perform traffic control of user data, flow of processing of sending information relating to a transmission data amount illustrated in FIG. 10 may be used. FIG. 10 illustrates that processing in FIG. 7 is executed in the communication system illustrated in FIG. 8. In other words, FIG. 10 illustrates that each piece of processing in FIG. 7 is executed by using 5GC in FIG. 8. Steps S 41 to S 46 in FIG. 10 are similar to steps S 21 to S 26 in FIG. 7, and therefore, detailed description thereof is omitted.

As described above, in 5GC in Example Embodiment 4 as well, the AMF 240 can perform, in consideration of a traffic characteristic of an application operating between the AF 300 and the UE 200, traffic control relating to user data transferred as control data. The AMF 240 is equivalent to the MME 100. Further, the UPF 220 can perform traffic control relating to user data, in consideration of a traffic characteristic of an application operating between the AF 300 and the UE 200. By performing such control, the AMF 240 and the UPF 220 can reduce a possibility of occurrence of a problem that a service itself provided by the application fails to operate. The problem that a service itself provided by the application fails to operate is caused by performing traffic control which does not consider a traffic characteristic of an application operating between the AF 300 and the UE 200.

Figure 11:
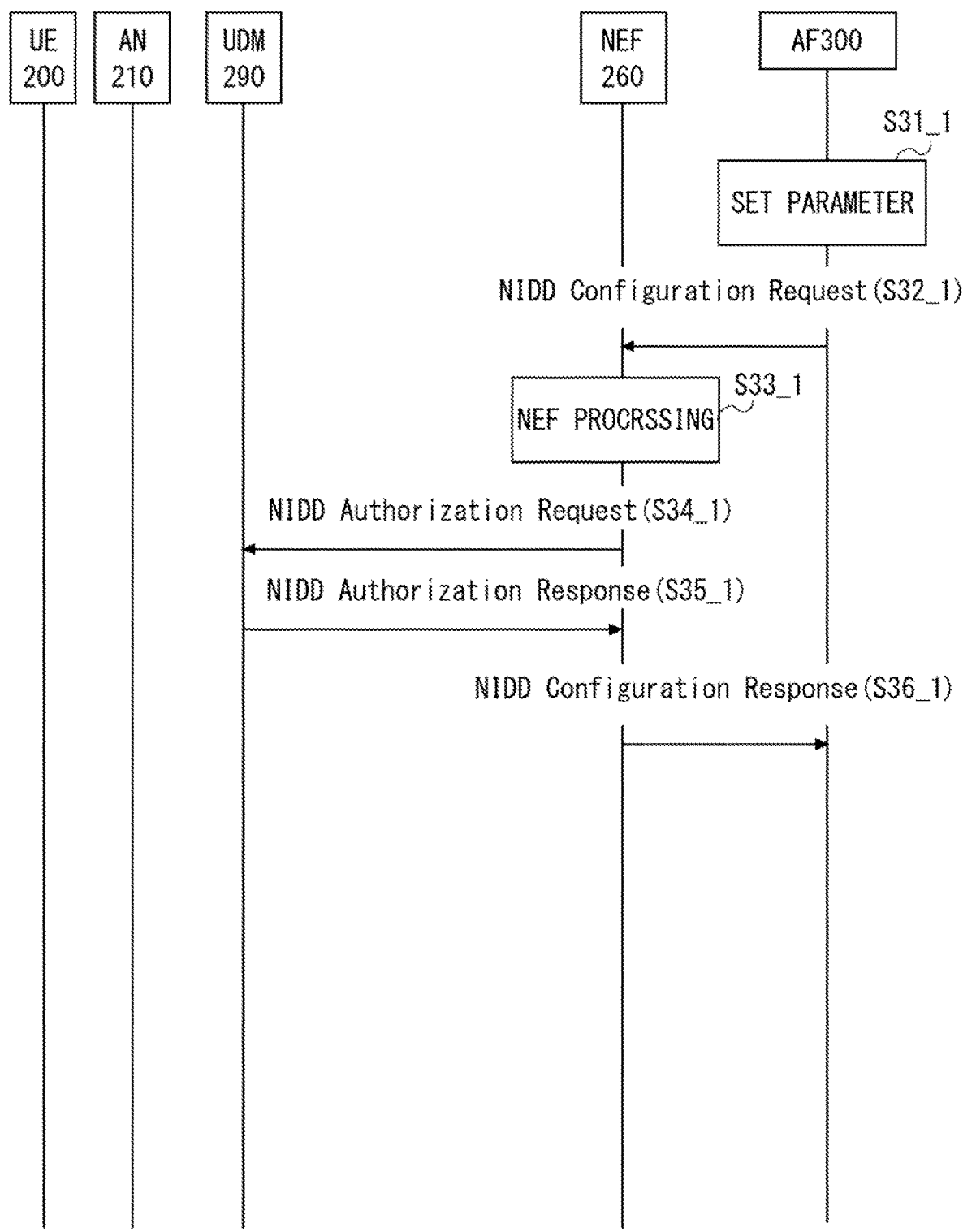
FIG. 11 is a diagram illustrating flow of processing of sending information relating to a transmission data amount according to a modification example of Example Embodiment 4.

Now, a modification example of Example Embodiment 4 is described. Flow of processing of sending information relating to a transmission data amount according to the modification example of Example Embodiment 4 is described by using FIG. 11. First, the AF 300 determines, as a parameter relating to the UE 200, at least one of a quota, rate control, and a charging policy (S31_1).

Next, the AF 300 transmits, to the NEF 260, an NIDD configuration request message in which the parameter determined in step S 31_1 is set (S32_1). The NIDD configuration request message may be a T 8 set suggested network configuration request message.

The NEF 260 holds, as management data for the UE 200, the quota, the rate control, and the charging policy set in the NIDD configuration request message (S32_1) (S33_1).

The NEF 260 transmits an NIDD authorization request message to the UDM 290 (S34_1). At least one of the quota, the rate control, and the charging policy set in the NIDD configuration request message (S32_1) is set in the NIDD authorization request message as a parameter. The NIDD authorization request message may be a set suggested network configuration request message.

The UDM 290 holds, as subscriber data for the UE 200, at least one of a quota, rate control, and a charging policy relating to the UE 200. The UDM 290 transmits an NIDD authorization response message to the NEF 260 (S35_1). At least one of a quota, rate control, and a charging policy relating to the UE 200 updated by the UDM 290 may be set in the NIDD authorization response message (S35_1). The UDM 290 may set a cause indicating a fact (reject) of being unable to receive at least one or all of the quota, the rate control, and the charging policy set in the NIDD authorization request message (S34_1). The NIDD authorization response message may be a set suggested network configuration response message.

The NEF 260 transmits an NIDD configuration response message to the AF 300 (S36_1). At least one of the quota, the rate control, and the charging policy relating to the UE 200 updated by the UDM 290 may be set in the NIDD configuration response message (S36_1). The NEF 260 may set a cause indicating a fact (reject) of being unable to receive at least one or all of the quota, the rate control, and the charging policy set in the NIDD configuration request message (S32_1). The NIDD configuration request message may be a T 8 set suggested network configuration response message.

As described above, the UDM 290 according to the modification example of Example Embodiment 4 can receive, from the NEF 260, at least one of a quota, rate control, and a charging policy. Further, through movement management of the UE 200 operating after completion of this operation, and session management, the UDM 290 becomes able to send at least one of the quota, the rate control, and the charging policy to the AMF 240, the UPF 220, and the UE 200. Moreover, the UDM 290 can perform, in consideration of a traffic characteristic of an application operating between the AF 300 and the UE 200, traffic control relating to data transmitted from the UE 200 to the AF 300, and user data transmitted from the AF 300 to the UE 200. When sending at least one of the quota, the rate control, and the charging policy to the AMF 240, the UDM 290 may use an insert subscriber data request message. Moreover, when sending at least one of the quota, the rate control, and the charging policy to the UE 200, the UDM 290 may send via the AMF 240 by using a protocol configuration option (PCO) parameter. By performing traffic control in consideration of a traffic characteristic of an application operating between the AF 300 and the UE 200, the AMF 240, the UPF 220, and the UE 200 according to the modification example of Example Embodiment 4 can reduce a possibility of occurrence of a problem that a service itself provided by the application fails to operate. The possibility of occurrence of problem that a service itself provided by the application fails to operate is caused by performing traffic control which does not consider a traffic characteristic of an application operating between the AF 300 and the UE 200.

Additionally, the AMF 240 may transmit, to the AN 210 or the UE 200, at least one of a quota, rate control, and a charging policy. In this case, the AN 210 or the UE 200 may perform traffic control relating to user data which are transferred, assuming that the user data are transmitted from the UE 200 to the AF 300.

Now, configuration examples of the control device 10, the UE 60, and the UE 200 described in the plurality of above-described example embodiments are described below by using FIGS. 12 and 13.

Figure 12:
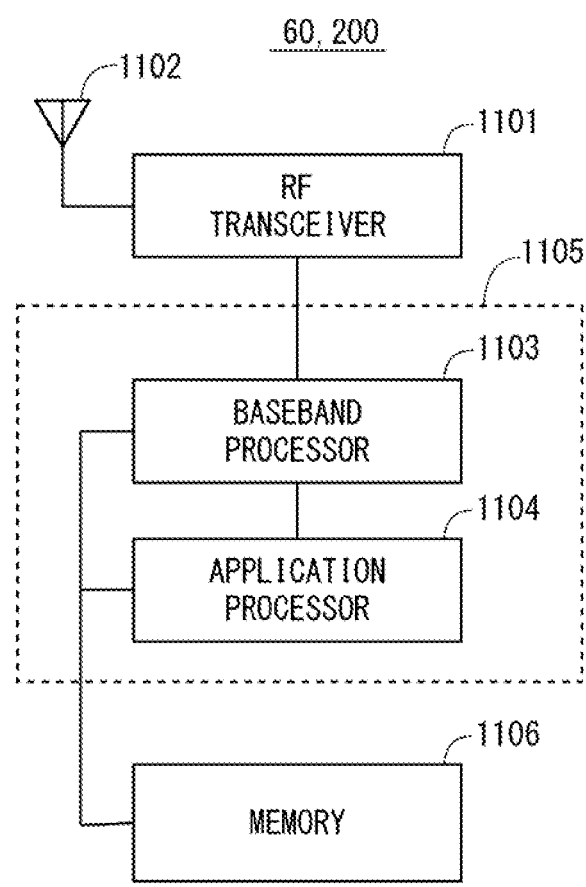
FIG. 12 is a configuration diagram of UE according to each example embodiment.

FIG. 12 is a block diagram illustrating configuration examples of the UE 60 and the UE 200. A radio frequency (RF) transceiver 1101 performs analog RF signal processing in order to communicate with an eNB or a gNB. The analog RF signal processing performed by the RF transceiver 1101 includes frequency up conversion, frequency down conversion, and amplification. The RF transceiver 1101 is coupled to an antenna 1102 and a baseband processor 1103. In other words, the RF transceiver 1101 receives modulation symbol data (or orthogonal frequency division multiplexing (OFDM) symbol data) from the baseband processor 1103, generates a transmission RF signal, and supplies the transmission RF signal to the antenna 1102. Moreover, the RF transceiver 1101 generates a baseband reception signal, based on a reception RF signal received by the antenna 1102, and supplies the baseband reception signal to the baseband processor 1103.

The baseband processor 1103 performs digital baseband signal processing (data plane processing) and control plane processing for wireless communication. The digital baseband signal processing includes (a) data compression/restoration, (b) segmentation/concatenation of data, (c) generation/decomposition of a transfer format (transfer frame), (d) transfer path coding/decoding, (e) modulation (symbol mapping)/demodulation, (f) generation of OFDM symbol data (a baseband OFDM signal) by inverse fast Fourier transform (IFFT), and the like. On the other hand, the control plane processing includes communication management of a layer 1 (e.g., transmission power control), a layer 2 (e.g., wireless resource management, and hybrid automatic repeat request (HARQ) processing), and a layer 3 (e.g., signaling relating to attach, mobility, and call management).

For example, in a case of LTE and LTE-Advanced, the baseband signal processing by the baseband processor 1103 may include signal processing of a packet data convergence protocol (PDCP) layer, a radio link control (RLC) layer, a MAC layer, and a PHY layer. Moreover, the control plane processing by the baseband processor 1103 may include processing of a non-access stratum (NAS) protocol, an RRC protocol, and a MAC CE.

The baseband processor 1103 may include a modem processor (e.g., digital signal processor (DSP)) which performs digital baseband signal processing, and a protocol stack processor (e.g., central processing unit (CPU)) which performs control plane processing, or a micro processing unit (MPU)). In this case, the protocol stack processor which performs control plane processing and an application processor 1104 may be formed into a common processor.

The application processor 1104 is also referred to as a CPU, an MPU, a microprocessor, or a processor core. The application processor 1104 may include a plurality of processors (a plurality of processor cores). The application processor 1104 implements various functions of the UE 60 and the UE 200 by executing a system software program (an operating system (OS)) and various application programs read from a memory 1106 or a non-illustrated memory. An application program may be, for example, a call application, a Web browser, a mailer, a camera operation application, or a music playback application.

In several implementations, the baseband processor 1103 and the application processor 1104 may be integrated on one chip, as indicated by a broken line (1105) in FIG. 12. In other words, the baseband processor 1103 and the application processor 1104 may be implemented as one system on chip (SoC) device 1105. The SoC device may be also referred to as a system large scale integration (LSI) or a chip set.

The memory 1106 is a volatile memory or a non-volatile memory, or is a combination thereof. The memory 1106 may include a plurality of physically independent memory devices. A volatile memory is, for example, a static random access memory (SRAM) or a dynamic RAM (DRAM), or is a combination thereof. A non-volatile memory is a mask read only memory (MROM), an electrically erasable programmable ROM (EEPROM), a flash memory, or a hard disk drive, or is any combination thereof. For example, the memory 1106 may include an external memory device accessible from the baseband processor 1103, the application processor 1104, and the SoC 1105. The memory 1106 may include an internal memory device integrated in the baseband processor 1103, the application processor 1104, or the SoC 1105. Further, the memory 1106 may include a memory in a universal integrated circuit card (UICC).

The memory 1106 may store a software module (computer program) including an instruction group and data for performing processing by the UE 60 described in the plurality of above-described example embodiments. In several implementations, the baseband processor 1103 or the application processor 1104 may be configured in such a way as to perform processing of the UE 60 and the UE 200 described in the above-described example embodiments, by reading and then executing the software module from the memory 1106.

Figure 13:
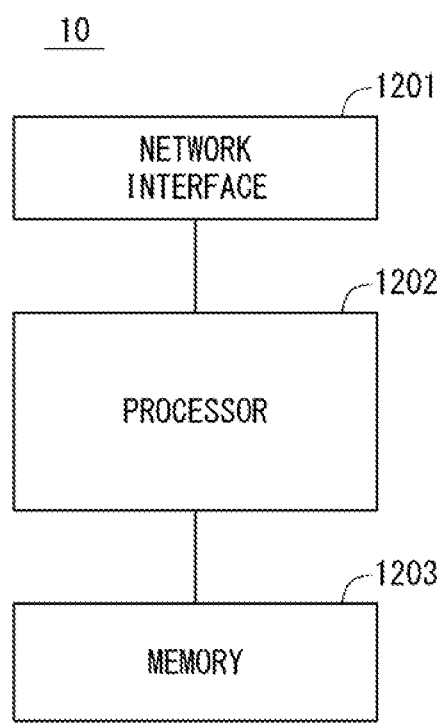
FIG. 13 is a configuration diagram of a control device according to each example embodiment.

FIG. 13 is a block diagram illustrating a configuration example of the control device 10. Referring to FIG. 13, the control device 10 includes a network interface 1201, a processor 1202, and a memory 1203. The network interface 1201 is used in order to communicate with another network node device configuring a communication system. The network interface 1201 may include, for example, a network interface card (NIC) compliant with an IEEE 802.3 series.

The processor 1202 performs processing of the control device 10 described by using a sequence diagram and a flowchart in the above-described example embodiments, by reading and then executing software (computer program) from the memory 1203. The processor 1202 may be, for example, a microprocessor, a micro processing unit (MPU), or a central processing unit (CPU). The processor 1202 may include a plurality of processors.

The memory 1203 is configured by a combination of a volatile memory and a non-volatile memory. The memory 1203 may include a storage disposed away from the processor 1202. In this case, the processor 1202 may access the memory 1203 via a non-illustrated I/O interface.

In the example of FIG. 13, the memory 1203 is used in order to store a software module group. The processor 1202 can perform processing of the control device 10 described in the above-described example embodiments, by reading and then executing the software module group from the memory 1203.

As described by using FIG. 13, each of the processors included in the control device 10 executes one or more programs including an instruction group for causing a computer to perform an algorithm described by using the drawings.

In the example described above, a program can be stored by using various types of non-transitory computer readable media, and supplied to a computer. A non-transitory computer readable medium includes various types of tangible storage media. Examples of non-transitory computer readable media include a magnetic recording medium, a magnet-optical recording medium, a read only memory (CD-ROM), a CD-R, a CD-R/W, and a semiconductor memory. A magnetic recording medium may be, for example, a flexible disk, a magnetic tape, or a hard disk drive. A magnet-optical recording medium may be, for example, a magnet-optical disk. A semiconductor memory may be, for example, a mask ROM, a programmable ROM (PROM), an erasable PROM (EPROM), a flash ROM, or a random access memory (RAM). Moreover, a program may be supplied to a computer by various types of transitory computer readable media. Examples of transitory computer readable media include an electric signal, an optical signal, and an electromagnetic wave. A non-transitory computer readable medium can supply a program to a computer via a wired communication path such as an electric wire and an optical fiber, or a wireless communication path.

Note that the present disclosure is not limited to the above-described example embodiments, and can be suitably modified without departing from the spirit thereof. Moreover, the present disclosure may be implemented by suitably combining the respective example embodiments.

While the invention of the present application has been described with reference to the example embodiments, the invention of the present application is not limited by the above description. Various changes that may be understood by a person skilled in the art can be made to a configuration and details of the invention of the present application within the scope of the invention.

Some or all of the above-described example embodiments may be also described as, but are not limited to, the following supplementary notes.

(Supplementary Note 1)
A control device including:
a communication unit configured to receive, via a service control device which authenticates an application server providing a service to a communication terminal, information relating to a transmittable data amount determined in the application server; and
a control unit configured to execute, by using the information relating to the transmittable data amount, traffic control on data transmitted from the communication terminal.

(Supplementary Note 2)
The control device according to Supplementary note 1, wherein the information relating to the transmittable data amount includes at least one of a quota, rate control, and a charging policy.

(Supplementary Note 3)
The control device according to Supplementary note 1 or 2, wherein the control unit refuses transmission of data exceeding a data amount predetermined in the information relating to the transmittable data amount.

(Supplementary Note 4)
The control device according to any one of Supplementary notes 1 to 3, wherein the control unit executes traffic control on Internet of Things (IoT) data transmitted from the communication terminal as C-plane data or U-plane data.

(Supplementary Note 5)
The control device according to any one of Supplementary notes 1 to 4, wherein the communication unit transmits the information relating to the transmittable data amount to at least either the communication terminal or a base station.

(Supplementary Note 6)
A communication terminal including:
a communication unit configured to receive, via a service control device and a control device which authenticate an application server providing a service to the communication terminal, information relating to a transmittable data amount determined in the application server; and
a control unit configured to execute, by using the information relating to the transmittable data amount, traffic control on data to be transmitted.

(Supplementary Note 7)
A control method being executed in a control device, the control method including:
receiving, via a service control device which authenticates an application server providing a service to a communication terminal, information relating to a transmittable data amount determined in the application server; and
executing, by using the information relating to the transmittable data amount, traffic control on data transmitted from the communication terminal.

(Supplementary Note 8)
A program which causes a computer to execute:
receiving, via a service control device which authenticates an application server providing a service to a communication terminal, information relating to a transmittable data amount determined in the application server; and
executing, by using the information relating to the transmittable data amount, traffic control on data transmitted from the communication terminal.

(Supplementary Note 9)
A method for a mobility management entity (MME) including:
receiving a CP parameter relating to uplink data or a CP parameter relating to downlink data from a service capability exposure function (SCEF) node via a home subscriber server (HSS); and
holding the CP parameter relating to the uplink data or the CP parameter relating to the downlink data.

(Supplementary Note 10)
The method for the MME according to Supplementary note 9, further including transmitting, to a base station, the CP parameter relating to the uplink data or the CP parameter relating to the downlink data.

(Supplementary Note 11)
The method for the MME according to Supplementary note 10, further including providing, for control of a transfer resource, the base station with the CP parameter relating to the uplink data or the CP parameter relating to the downlink data.

(Supplementary Note 12)
The method for the MME according to Supplementary note 10 or 11, wherein the base station is an evolved Node B (eNB).

(Supplementary Note 13)
A mobility management entity (MME) including:
a means for receiving a CP parameter relating to uplink data or a CP parameter relating to downlink data from a service capability exposure function (SCEF) node via a home subscriber server (HSS); and
a means for holding the CP parameter relating to the uplink data or the CP parameter relating to the downlink data.

(Supplementary Note 14)

The MME according to Supplementary note 13, further including a means for transmitting, to a base station, the CP parameter relating to the uplink data or the CP parameter relating to the downlink data.

(Supplementary Note 15)

The MME according to Supplementary note 14, wherein the base station is provided, for control of a transfer resource, with the CP parameter relating to the uplink data or the CP parameter relating to the downlink data.

(Supplementary Note 16)

The MME according to Supplementary note 14 or 15, wherein the base station is an evolved Node B (eNB).

(Supplementary Note 17)

A method for a base station, including:
receiving a CP parameter relating to uplink data or a CP parameter relating to downlink data from a mobility management entity (MME); and
using, for control of a transfer resource, the CP parameter relating to the uplink data or the CP parameter relating to the downlink data.

(Supplementary Note 18)

The method for the base station according to Supplementary note 17, wherein
the base station is an evolved Node B (eNB).

(Supplementary Note 19)

A base station including:
a means for receiving a CP parameter relating to uplink data or a CP parameter relating to downlink data from a mobility management entity (MME); and
a means for using, for control of a transfer resource, the CP parameter relating to the uplink data or the CP parameter relating to the downlink data.

(Supplementary Note 20)

The base station according to Supplementary note 19, wherein
the base station is an evolved Node B (eNB).

REFERENCE SIGNS LIST

10 CONTROL DEVICE
11 CONTROL UNIT
12 COMMUNICATION UNIT
20 SERVICE CONTROL DEVICE
30 APPLICATION SERVER
40 BASE STATION
50 COMMUNICATION TERMINAL
60 UE
61 CONTROL UNIT
62 COMMUNICATION UNIT
70 eNB
80 SGW
90 PGW
95 PCRF
100 MME
110 SCEF
120 HSS
130 AS
200 UE
210 AN
220 UPF
230 AUSF
240 AMF
250 SMF
260 NEF
270 NRF
280 PCF
290 UDM
300 AF
310 DN

The invention claimed is:

1. A method of a communication terminal, the method comprising:
receiving a rate control parameter sent from a core network node via an Access and Mobility Management Function (AMF) node and an Access Network (AN); and
using the rate control parameter as a limit of uplink user data that is sent on a control plane.

2. The method according to claim 1, wherein the rate control parameter indicates limiting the number of messages that the communication terminal sends during a predetermined period.

3. The method according to claim 1, wherein the communication terminal limits the number of messages that the communication terminal sends during a predetermined period by using the rate control parameter.

4. The method according to claim 1, wherein the communication terminal limits a rate of the uplink user data by using the rate control parameter.

5. The method according to claim 1, wherein the communication terminal comprises an Internet of Things (IoT) terminal.

6. A communication terminal comprising:
a receiver configured to receive a rate control parameter sent from a core network node via an Access and Mobility Management Function (AMF) node and an Access Network (AN); and
a processor configured to use the rate control parameter as a limit of uplink user data that is sent on a control plane.

7. The communication terminal according to claim 6, wherein the rate control parameter indicates limiting the number of messages that are sent during a predetermined period.

8. The communication terminal according to claim 6, wherein the processor limits the number of messages that are sent during a predetermined period by using the rate control parameter.

9. The communication terminal according to claim 6, wherein the processor limits a rate of the uplink user data by using the rate control parameter.

10. The communication terminal according to claim 6, wherein the communication terminal comprises an Internet of Things (IoT) terminal.

* * * * *